UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GREENISH-BLUE TRIPHENYLMETHANE DYE.

998,139.   Specification of Letters Patent.   Patented July 18, 1911.

No Drawing.   Application filed April 11, 1911.   Serial No. 620,426.

*To all whom it may concern:*

Be it known that I, MAX WEILER, doctor of philosophy, chemist, a citizen of the German Empire, residing at Elberfeld, Germany, have invented new and useful Improvements in Greenish-Blue Triphenylmethane Dye, of which the following is a specification.

I have found that the pentachlorobenzaldehyde can be advantageously used to produce a new valuable mordant dyestuff of the triaryl-methane series. The process for its manufacture consists in condensing the pentachlorobenzaldehyde with ortho-cresotinic acid to a leuco compound which is converted by oxidation into a dyestuff capable of being chromed after dyeing, furnishing shades fast to alkali, milling and potting.

In order to illustrate the new process more fully the following example is given, the parts being by weight:—20 parts of pentachlorobenzaldehyde are stirred at 30–50° C. together with 25 parts of ortho-cresotinic acid and 200 parts of sulfuric acid (66° Bé.) to which 80 parts of glacial acetic acid has been added until the cresotinic acid has disappeared. By adding water to the solution the colorless leuco acid is obtained, which is freed from unchanged aldehyde by dissolving it in soda. It is easily soluble in alcohol or acetone and gives in this solvent with ferric chlorid and also with bichromate and sulfuric acid an intense blue color. For oxidation the leuco acid is stirred together with eight times its quantity of sulfuric acid (90–96 per cent.) and one molecule of nitrite at 35–50° C. until the quantity of the dyestuff produced is not further increased. The product of the reaction is poured on ice and the dyestuff separates as a brown-yellow powder insoluble in water. It is soluble in soda with a slightly brown color and in caustic soda lye with an intense blue color. It dyes wool from an acid bath red-brown shades which on chroming turn into a greenish-blue.

I claim:—

The herein described new dyestuff having probably the formula

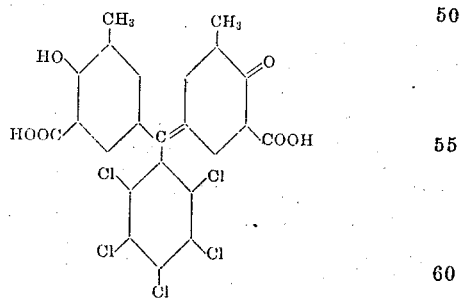

which is after being dried and pulverized a brown yellow powder insoluble in water, being soluble in caustic soda lye with a blue color; dyeing wool red-brown shades which on chroming turn into a greenish-blue, substantially as described.

In testimony whereof I have hereunto set my hand in the presence of two subscribing witnesses.

MAX WEILER. [L. S.]

Witnesses:
ALFRED HENKEL,
E. VOSS.